(12) United States Patent
Vittetoe

(10) Patent No.: US 11,439,068 B2
(45) Date of Patent: Sep. 13, 2022

(54) IMPELLER CONDITIONER INCLUDING A TINE DEVICE WITH LIMITED LATERAL MOVEMENT

(71) Applicant: DEERE & COMPANY, Moline, IL (US)

(72) Inventor: Jeremy D. Vittetoe, Washington, IA (US)

(73) Assignee: DEERE & COMPANY, Moline, IL (US)

( * ) Notice: Subject to any disclaimer, the term of this patent is extended or adjusted under 35 U.S.C. 154(b) by 831 days.

(21) Appl. No.: 16/271,137

(22) Filed: Feb. 8, 2019

(65) Prior Publication Data
US 2020/0253125 A1    Aug. 13, 2020

(51) Int. Cl.
| A01D 43/10 | (2006.01) |
| A01D 82/00 | (2006.01) |
| A01D 34/66 | (2006.01) |
| A01D 34/04 | (2006.01) |

(52) U.S. Cl.
CPC ............. *A01D 82/00* (2013.01); *A01D 34/66* (2013.01); *A01D 43/10* (2013.01); *A01D 34/04* (2013.01)

(58) Field of Classification Search
CPC ........ A01D 82/00; A01D 43/10; A01D 43/08; A01D 34/535; A01D 34/435; A01D 80/02; B02C 13/04; B02C 13/16
See application file for complete search history.

(56) References Cited

U.S. PATENT DOCUMENTS

| 3,043,080 A | * | 7/1962 | Mott | A01D 34/535 56/294 |
| 3,122,871 A | * | 3/1964 | Brilts | A01D 34/535 56/294 |
| 3,309,854 A | * | 3/1967 | Mitchell | A01D 34/535 56/294 |
| 3,402,541 A | * | 9/1968 | Woodring | A01D 34/535 56/294 |
| 3,627,010 A | * | 12/1971 | Rueff | F16G 13/18 56/294 |
| 3,645,076 A | | 2/1972 | Aldred | |

(Continued)

FOREIGN PATENT DOCUMENTS

| DE | 102005023014 B4 | * | 4/2008 | ........... A01D 34/535 |
| EP | 1481581 A1 | * | 12/2004 | ........... A01D 34/535 |

(Continued)

OTHER PUBLICATIONS

European Search Report issued in counterpart application No. 20155704.8 dated Jul. 22, 2020 (07 pages).

*Primary Examiner* — Alicia Torres
*Assistant Examiner* — Madeline I Runco

(57) ABSTRACT

An impeller conditioner for an agricultural mowing machine includes a rotor, an attachment device located on the rotor, a tine device pivotally attached to the rotor between a first end and a second end of the tine device via the attachment device, and a positioning device located on one of the rotor and the attachment device. The positioning device include a tapered portion which restricts the tine device in a first position to have less lateral movement than the tine device in a second position. The first position can be an operational position and the second position can be a non-operational position.

12 Claims, 8 Drawing Sheets

(56) References Cited

U.S. PATENT DOCUMENTS

| | | | | |
|---|---|---|---|---|
| 3,952,811 | A * | 4/1976 | Carre | B02C 13/04 |
| | | | | 404/90 |
| 4,182,099 | A | 1/1980 | Davis et al. | |
| 4,512,146 | A * | 4/1985 | Klinner | A01D 43/10 |
| | | | | 56/400.21 |
| 5,272,861 | A * | 12/1993 | Roynberg | A01F 29/095 |
| | | | | 56/294 |
| 6,996,965 | B2 * | 2/2006 | Ligouy | A01D 43/10 |
| | | | | 56/400 |
| 7,278,597 | B2 | 10/2007 | Fenton | |
| 8,166,740 | B2 | 5/2012 | Eubanks et al. | |
| 8,166,741 | B2 | 5/2012 | Barguet et al. | |
| 10,638,660 | B2 * | 5/2020 | Bachmann | A01D 34/535 |
| 2002/0194829 | A1 * | 12/2002 | Petersen | A01D 34/535 |
| | | | | 56/255 |
| 2018/0116122 | A1 | 5/2018 | Hill et al. | |
| 2019/0261567 | A1 | 8/2019 | Faust et al. | |
| 2019/0261570 | A1 | 8/2019 | Nichols et al. | |

FOREIGN PATENT DOCUMENTS

| | | | | |
|---|---|---|---|---|
| EP | 1915896 A1 * | 4/2008 | | A01D 34/535 |
| EP | 2241171 A1 | 10/2010 | | |
| EP | 2647277 A1 * | 10/2013 | | A01D 34/535 |
| EP | 2878188 A1 * | 6/2015 | | A01D 34/535 |
| EP | 2926641 A1 | 10/2015 | | |
| EP | 3284333 A1 * | 2/2018 | | A01D 34/535 |
| EP | 3871486 A1 * | 9/2021 | | |
| FR | 2881916 A1 * | 8/2006 | | A01D 34/535 |

\* cited by examiner

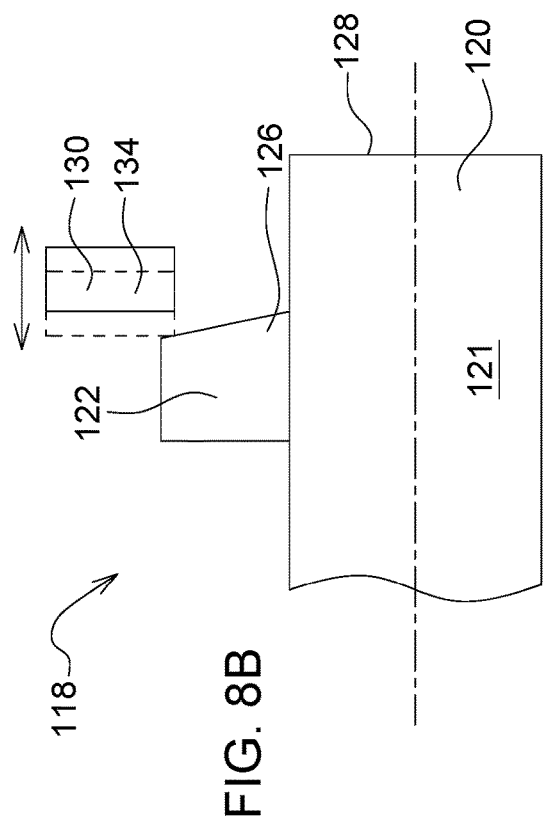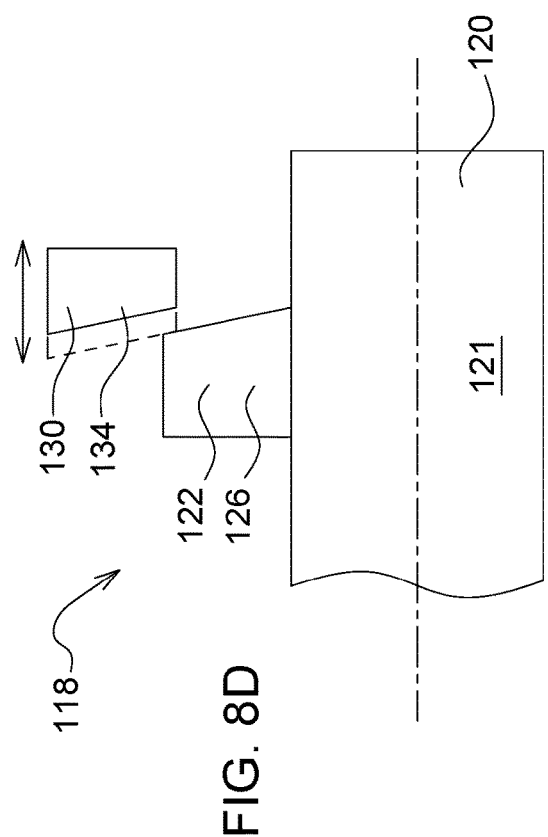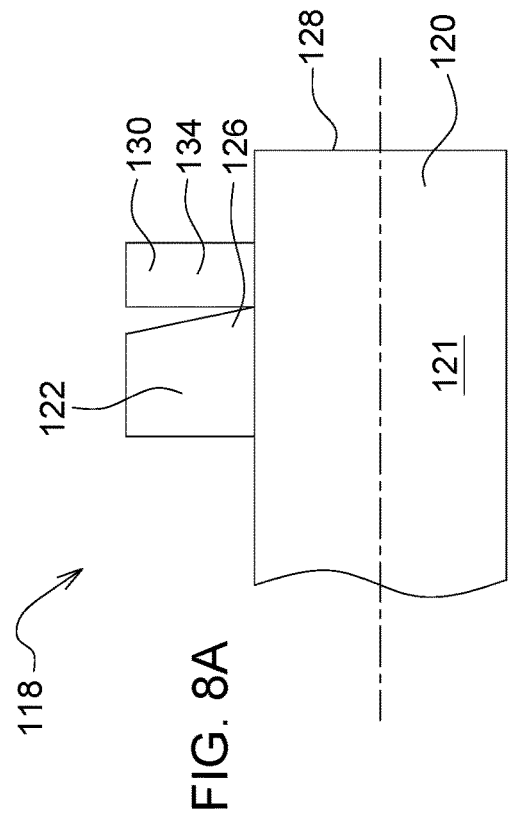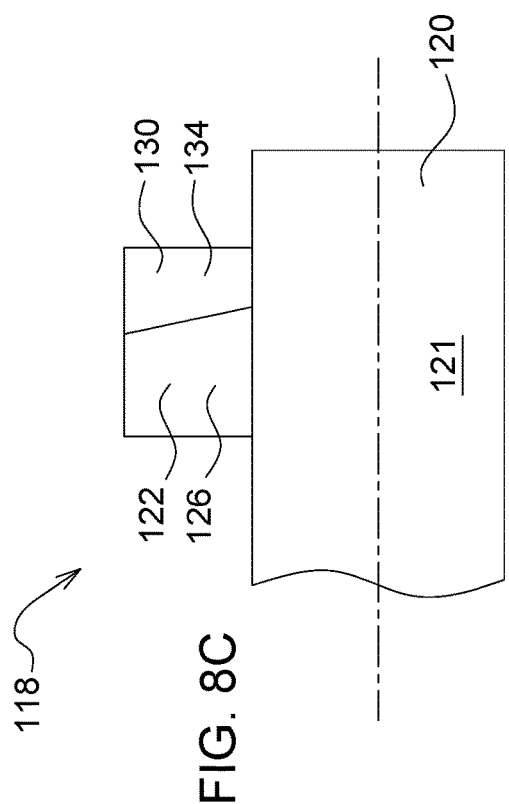

IMPELLER CONDITIONER INCLUDING A TINE DEVICE WITH LIMITED LATERAL MOVEMENT

CROSS-REFERENCE TO RELATED APPLICATIONS

N/A

FIELD OF THE DISCLOSURE

The present disclosure relates to agricultural mowing machines having an impeller for conditioning cut plant material.

BACKGROUND

In the hay and forage industry, agricultural mowing machines cut or mow crop material such as grasses, legumes, and other herbaceous plants. Agricultural mowing machines include mowers, mower conditioners, and self-propelled windrowers. Agricultural mowing machines include sickle bar and rotary disk cutting devices. Some agricultural mowing machines include a crop conditioner or conditioning device, which crimps or crushes the crop material for faster drying. One type of conditioning device is a flail conditioner or an impeller conditioner having a rotor and a plurality of tines pivotally connected to the rotor along the length of the rotor. The tines located near the ends of the rotor can contact the side sheets of the agricultural mowing machine, which can prematurely wear or damage the tines or side walls.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes an impeller conditioner with a tine device for conditioning the crop near the ends of the rotor without prematurely wearing or damaging the tines or side walls.

According to an aspect of the present disclosure, an impeller conditioner includes a rotor, an attachment device located on the rotor, a tine device pivotally attached to the rotor between a first end and a second end of the tine device via the attachment device, and a positioning device located on one of the rotor and the attachment device. The positioning device includes a tapered portion which restricts the tine device in a first position to have less lateral movement than the tine device in a second position. The first position can be an operational position and the second position can be a non-operational position.

According to an aspect of the present disclosure, an agricultural mowing machine includes a cutter bar, an impeller having a rotor, an attachment device located on the rotor, a tine device pivotally attached to the rotor between a first end and a second end of the tine device via the attachment device, and a positioning device located on one of the rotor and the attachment device. The positioning device includes a tapered portion which restricts the tine device in a first position to have less lateral movement than the tine device in a second position. The first position can be an operational position and the second position can be a non-operational position.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIGS. 8A-D are front schematic views of an impeller conditioner, according to an embodiment.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
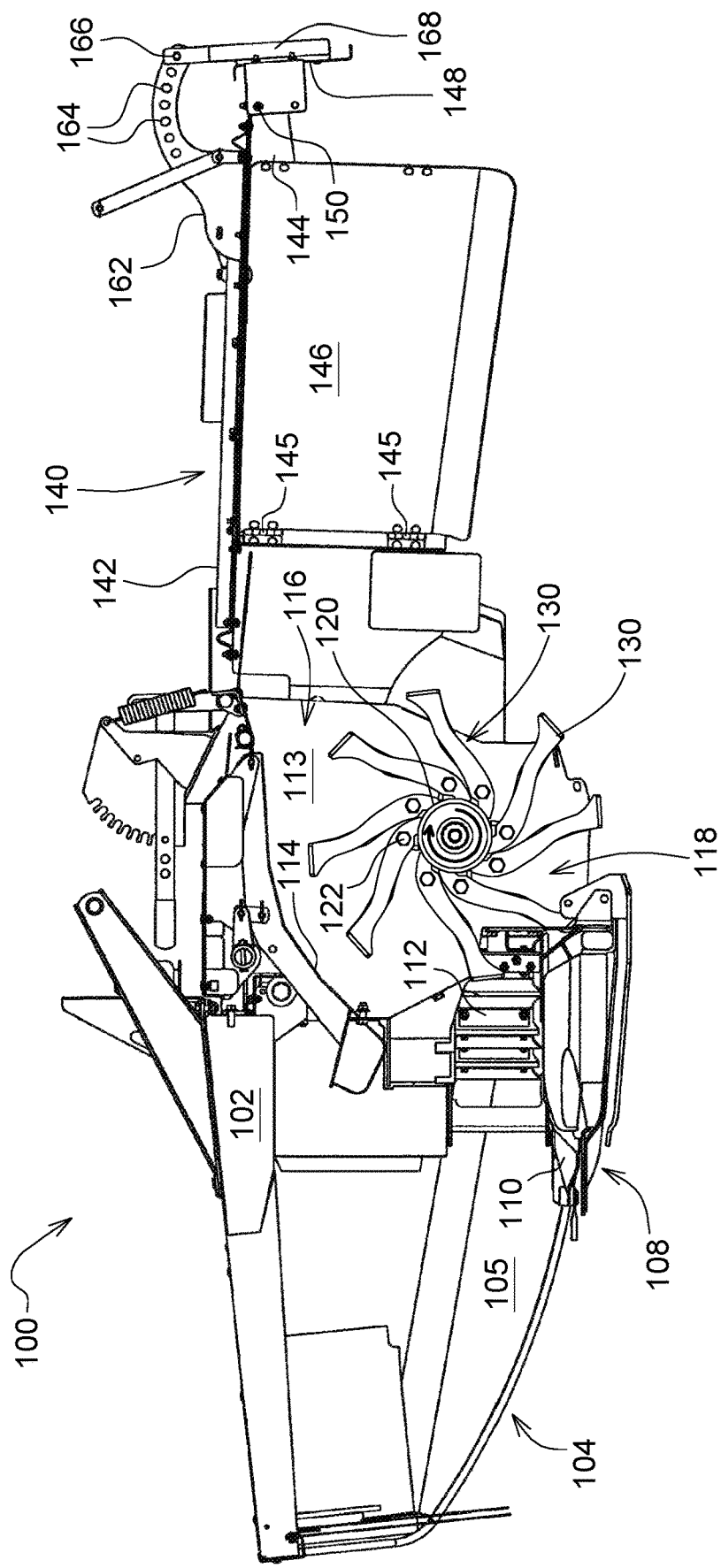
FIG. 1 is a side cutaway view of an agricultural mowing machine, according to an embodiment.

FIG. 1 illustrates an agricultural mowing machine 100, for example a mower conditioner. This disclosure also applies to other types of agricultural machines which include a flail or impeller conditioner, for example headers for self-propelled windrowers. The agricultural mowing machine 100 may be a pull type machine or may be self-propelled. Merely for convenience, the description will refer to the agricultural mowing machine 100 as a mower conditioner. The mower conditioner can include a frame or chassis 102, a housing 104 having side walls 105, a reciprocating or sickle cutter bar or a rotary disc cutter bar 108 having a plurality of cutting devices 110. The mower conditioner can include one or more converging drums 112 which cooperate with the cutting devices 110 to move or transfer the cut crop from the ends of the cutter bar 108 to a discharge opening leading into an impeller housing 116 including side walls or side sheets 113 and an arched impeller hood 114. The mower conditioner 100 can include a flail or impeller conditioner 118, hereinafter referred to as an impeller, having a rotor 120, for example a cylindrical tube, with a plurality of attachment devices 122 to which a plurality of tine devices 130 are pivotally or rotatably connected. The attachment devices 122 can be integral with or a separate member from the rotor 120. As depicted, the impeller 118 rotates in a clockwise direction. The impeller hood 114 can be spaced approximately concentric to a segment of the impeller 118 defining a passage for cut crop material to pass between the tine devices 130 and the impeller hood 114.

The mower conditioner 100 can include a forming shield arrangement 140 having a horizontal top wall 142 and side walls 144. The mower conditioner 100 can include side deflectors 146 located at each side of the forming shield arrangement 140 and pivotally or rotatably connected at joints or hinges 145, for pivoting the side deflectors 146 about a generally vertical axis. Each side deflector 146 can independently pivot about a generally vertical axis to direct the crop to the left side, right side, or center of the agricultural mowing machine 100 with respect to the forward direction of travel. The side deflectors 146 can be positioned inwardly towards each other to converge the crop material exiting the rear of the mower conditioner 100 at a narrower width than the crop material exiting the impeller 118. The mower conditioner 100 can include a top deflector 148 pivotally or rotatably connected to a rear end of the side wall 144 by a fastener 150 for pivoting about a horizontal transverse axis and deflecting crop toward the ground. The mower conditioner 100 can include an adjustment bracket 162 having a plurality of adjustment apertures 164 for selecting receiving a fastener 166. The top deflector 148 can include a connecting bracket 168 which selectively connects to the adjustment bracket 162 via the fastener 166 received in one of the adjustment apertures 164. The selected pivotal position of the top deflector 148 depends upon which adjustment aperture 164 is selected.

Figure 2:
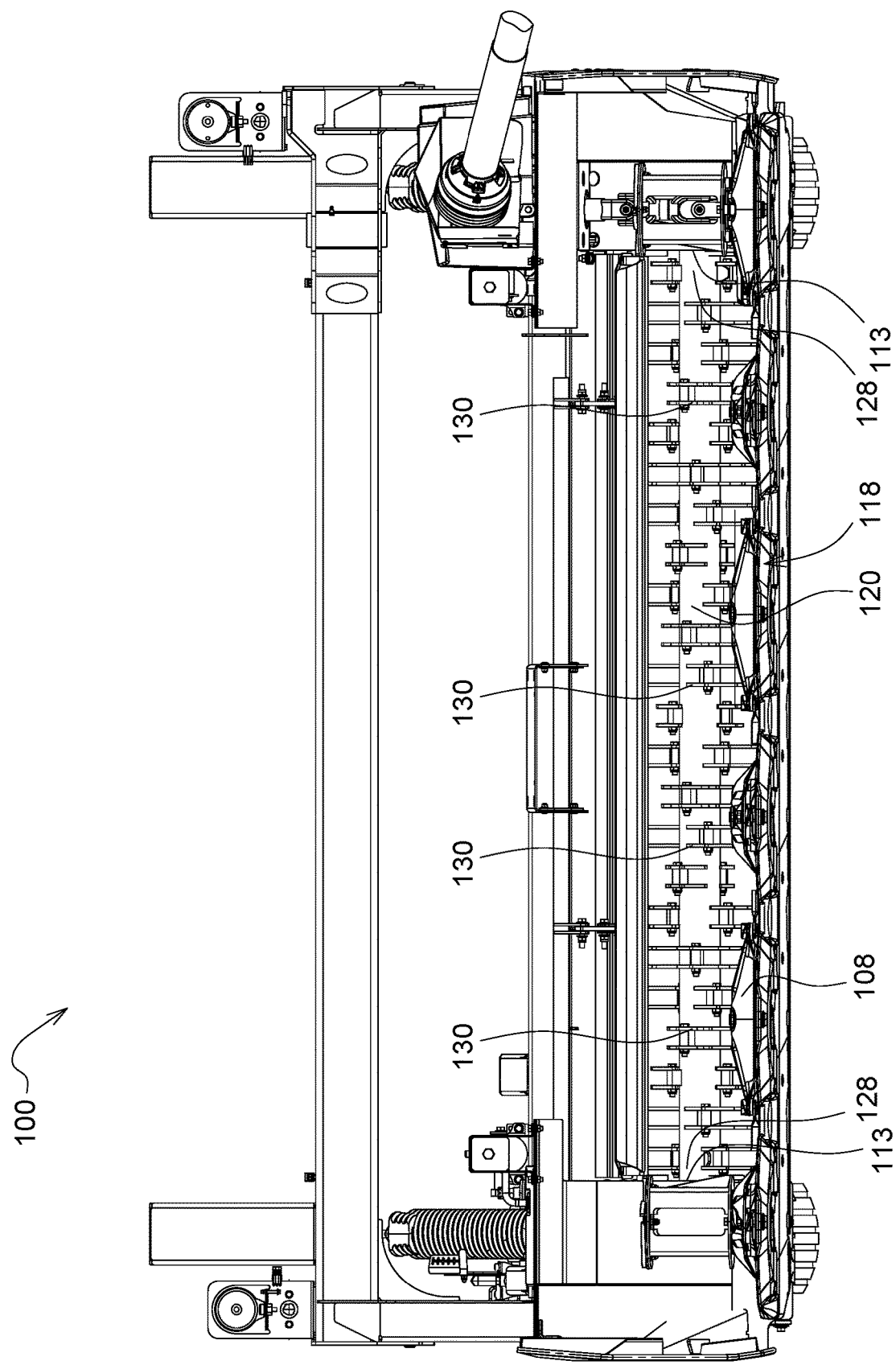
FIG. 2 is a front perspective view of an agricultural mowing machine, according to an embodiment.
Figure 3:
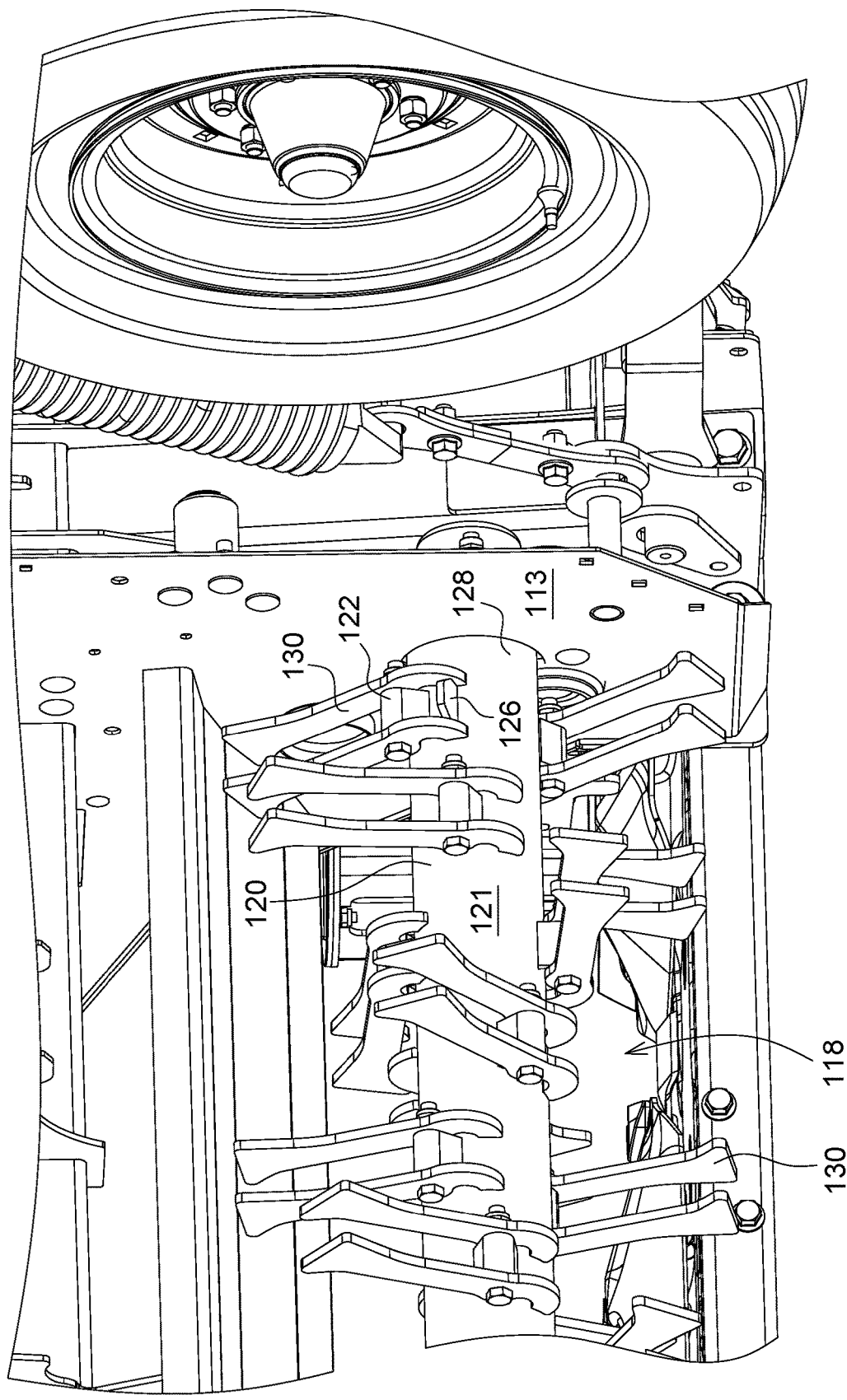
FIG. 3 is a partial front perspective view of an agricultural mowing machine, according to an embodiment.
Figure 4:
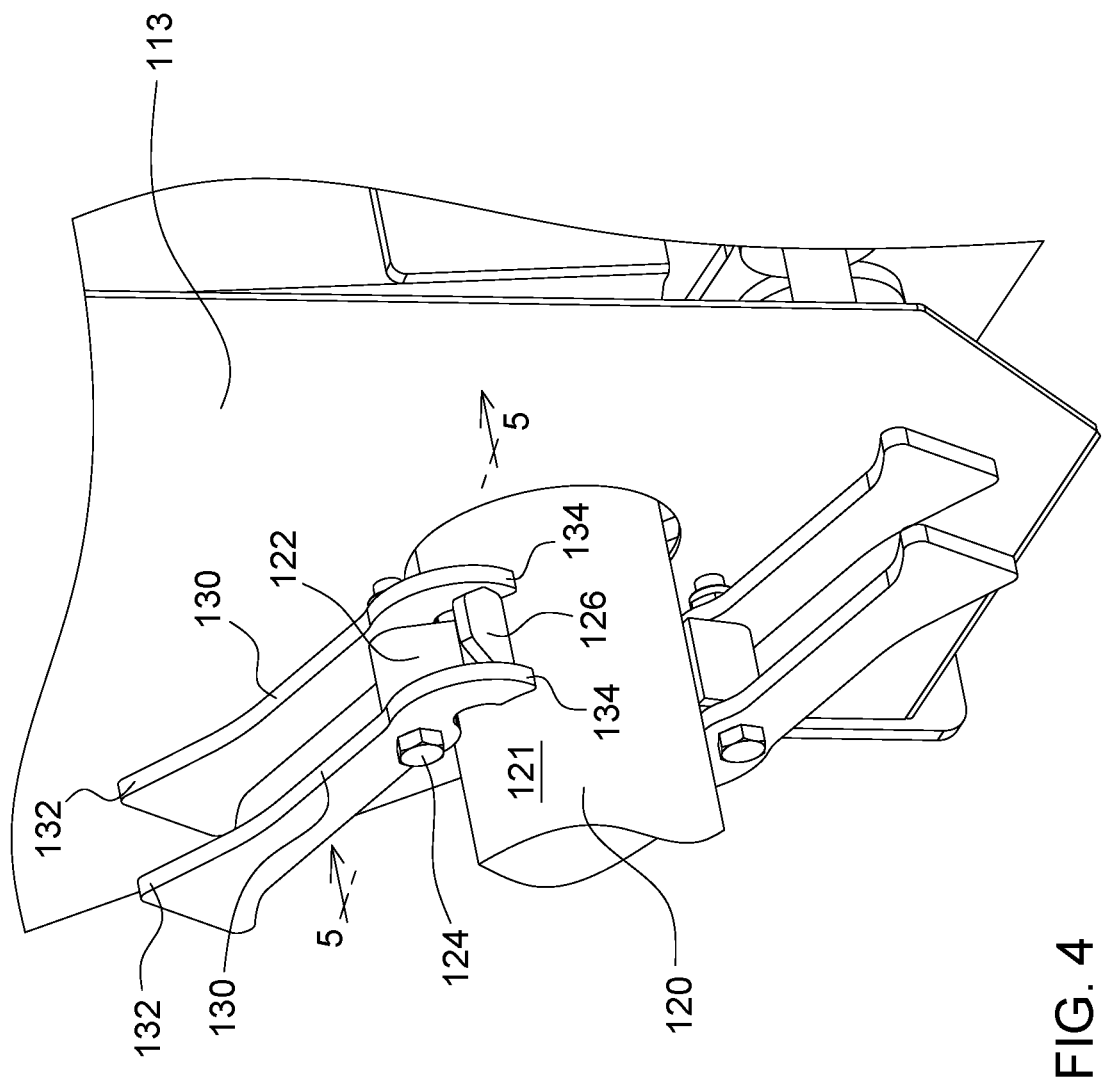
FIG. 4 is a perspective view of a tine device, according to an embodiment.

With reference to FIGS. 2-4, a mower conditioner 100 includes an impeller 118 having a plurality of tine devices 130 positioned along the length of a rotor 120 and positioned around an outside surface 121 of the rotor 120. Some of the tine devices 130 can be positioned near the ends 128 of the rotor 120 adjacent the side walls or side sheets 113. The tine devices 130 can be pivotally or rotatably attached to the impeller 118 via an attachment device 122 and a fastener 124. The tine devices 130 can be arranged in pairs with a tine device 130 positioned on each side of the attachment device 122 and pivotally attached via a fastener 124. The tine devices 130 have a first end 132 which selectively engages the crop material and a second end 134 which selectively engages the outer surface 121 of the rotor 120. The tine devices 130 are pivotally attached to the rotor 120 between the first and second ends 132, 134. The tine devices 130 can be pivotally attached to the impeller 118 nearer the second end 134. The impeller 118 can include a positioning device 126 located on the outer surface 121 of the rotor 120 near a tine device 130. The positioning device 126 can be integral with or a separate member from the rotor 120. The positioning device 126 can be positioned near or adjacent the second end 134 of the tine device 130. The positioning device 126 can be integral with or separate from the attachment device 122.

Figure 5A:
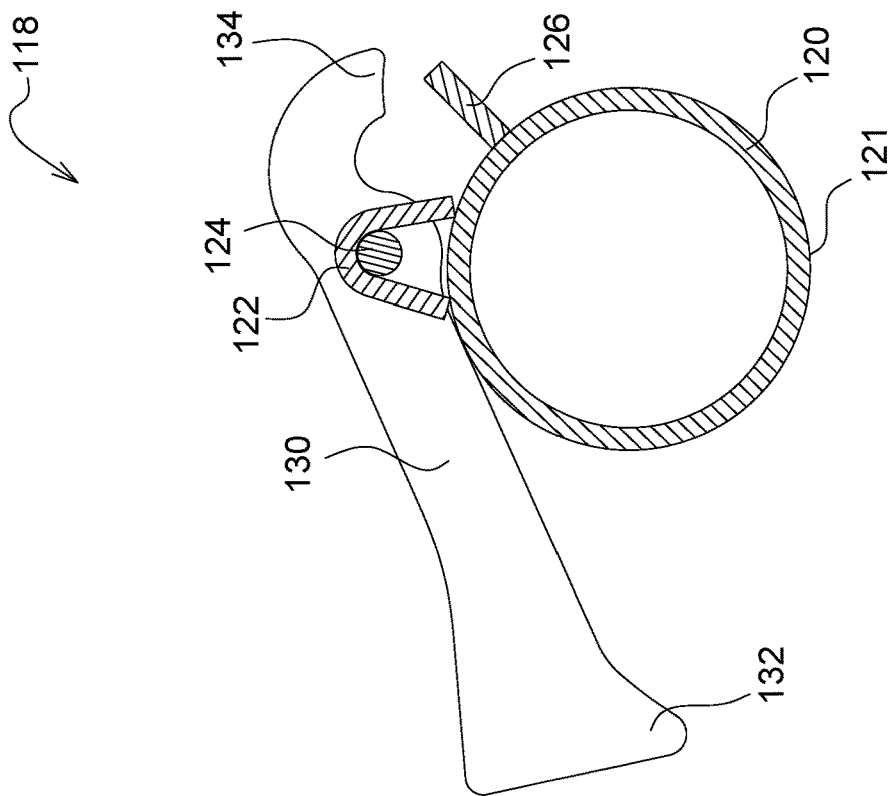
FIGS. 5A-B are side schematic views of an impeller conditioner, according to an embodiment.
Figure 5B:
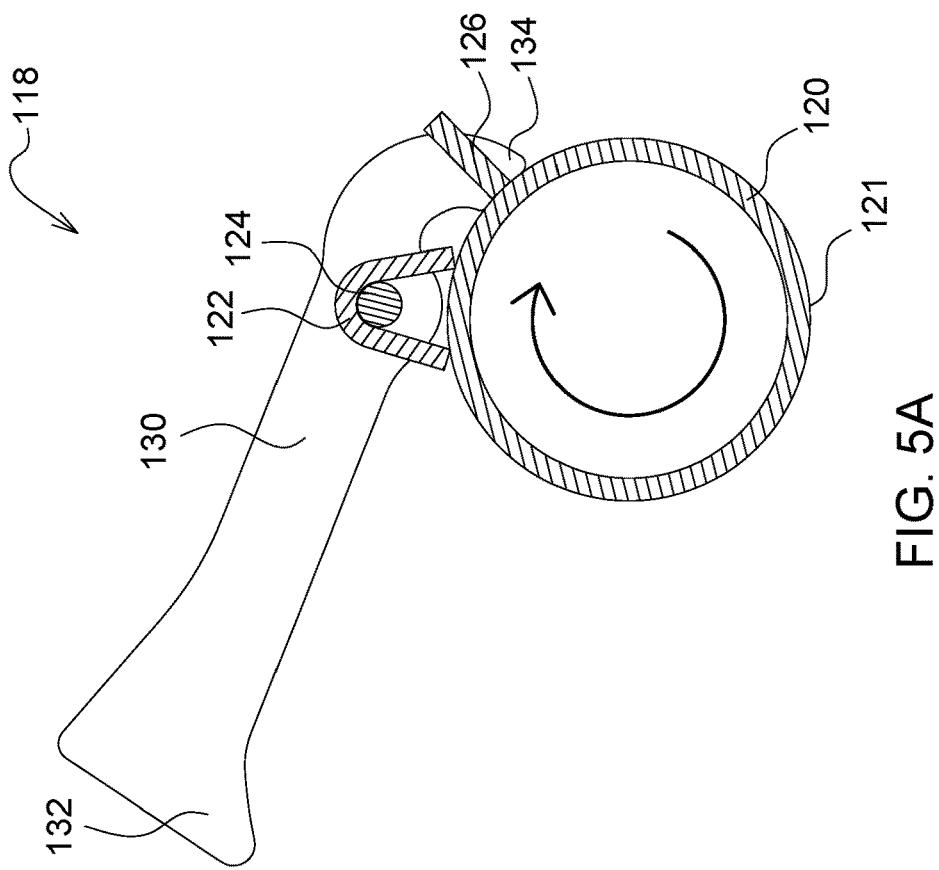
Figure 6A:
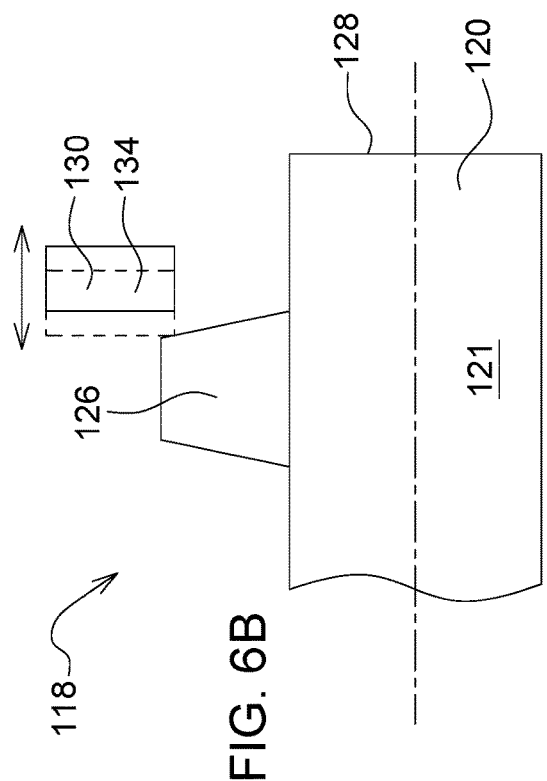
FIGS. 6A-D are a front schematic views of an impeller conditioner, according to an embodiment.
Figure 6B:
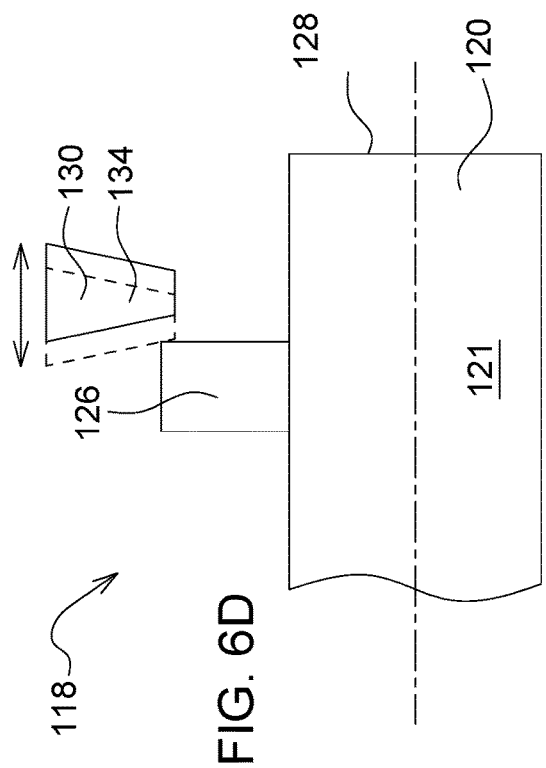
Figure 6C:
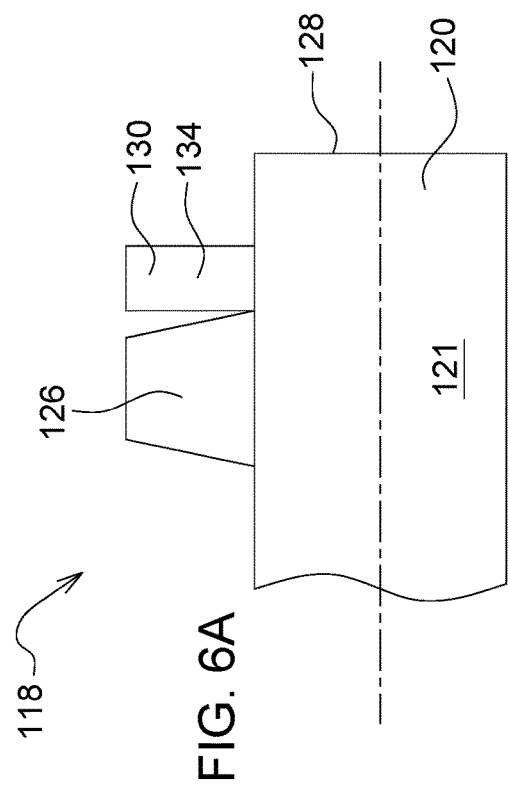
Figure 6D:
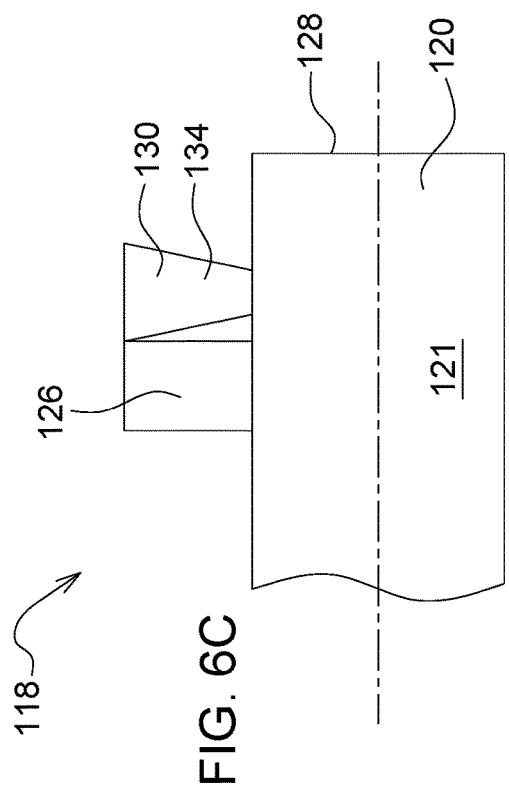
Figure 7A:
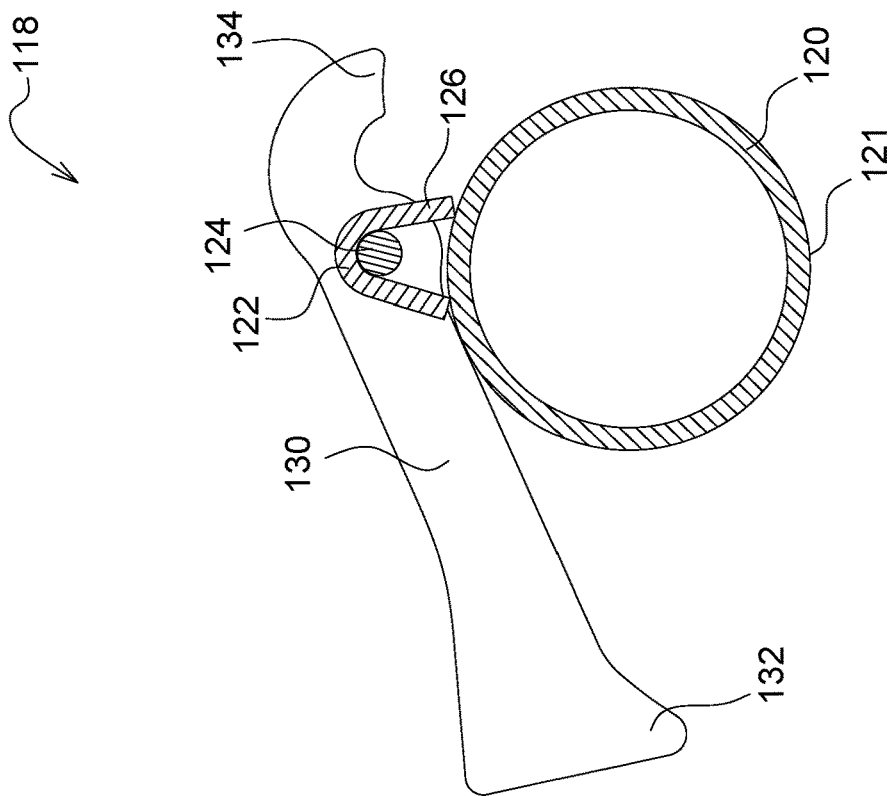
FIGS. 7A-B are side schematic views of an impeller conditioner, according to an embodiment.
Figure 7B:
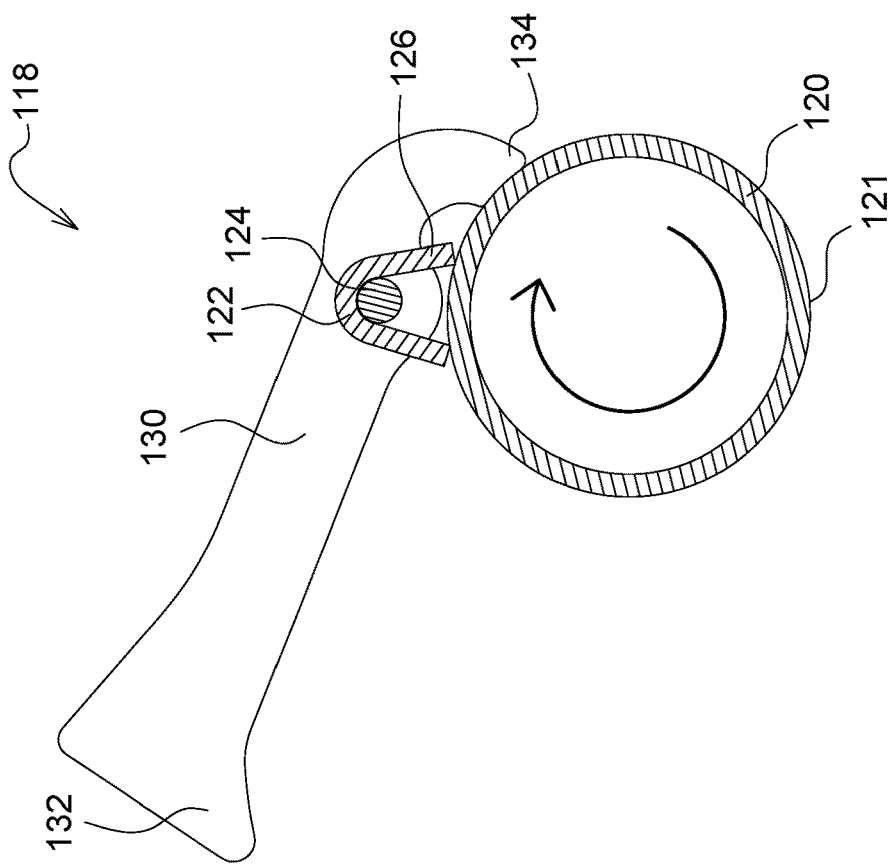

With reference to FIGS. 5A-B, 6A-D, 7A-B, and 8A-D, the tine device 130 can have a first or operational position and a second or non-operational position. In the first position, the first end 132 of the tine device is positioned outwardly away from the surface 121 of the rotor 120, and the second end 134 tine device 130 is positioned at or near the surface 121 of the rotor 120, as shown in FIGS. 5A, 6A, 6C, 7A, 8A, and 8C. In the first position, the tine device 130 is restricted or prevented from moving laterally or side to side due to the interaction of the tine device 130 and the positioning device 126, which can be a separate device, as shown in FIGS. 5A-B, or form a portion of the attachment device 122, as shown in FIGS. 7A-B. In the second position, the first end 132 of the tine device is positioned inwardly towards the surface 121 of the rotor 120, and the second end 134 tine device 130 is positioned outwardly away from the surface 121 of the rotor 120, as shown in FIGS. 5B, 6B, 6D, 7B, 8B, and 8D. In the second position, the tine device 130 can move laterally or side to side as shown in FIGS. 6B, 6D, 8B, and 8D because there is space or clearance between the second end 134 of the tine device 130 and the positioning device 126.

As depicted in FIGS. 5A and 7A, the rotor 120 rotates during operation causing the first end 132 of the tine device 130 to extend outwardly and engage crop material and the second end 134 of the tine device 130 to move inwardly towards the surface 121 of the rotor 120 (i.e., the first or operational position of the tine device 130).

As depicted in FIGS. 5B and 7B, the rotor 120 is not rotating (e.g., not in operation) allowing the first end 132 of the tine device 130 to move inwardly towards the surface 121 of the rotor 120 and the second end 134 of the tine device 130 to move outwardly away from the surface 121 of the rotor 120 (i.e., the second or non-operational position of the tine device 130). Depending upon the position of the tine device 130 around the surface 121 of the rotor 120 when the rotor 120 is not rotating, the tine device 130 could be in the first or second position, or at a position between the first and second positions.

One or more of the tine device 130 or the positioning device 126 can include a tapered portion on a surface located between the tine device 130 and the positioning device 126. The tine device 130, the attachment device 122, or both can include a tapered portion. The tine device 130, the positioning device 126, or both can include a tapered portion. The tine device 130 can include a tapered portion on a side such that it is wider at the top than the base. The positioning device 126 can include a tapered portion on a side such that it is wider at the base than the top. The positioning device 126 can be separate from or form a portion of the attachment device 122. The attachment device 122 and the positioning device 126 can be the same device such that the attachment device 122 is wider at the base than the top. The tapered portion can force the shorter second end 134 of the tine device 130 toward the end 128 of the rotor 120 which results in the longer first end 132 moving away from the end 128 of the rotor 120 when the tine device is in the first or operational position. This can prevent the longer first end 132 of the tine device 130 from contacting the side sheet 113. The tapered portion restricts, inhibits, or prevents lateral motion in the operational position when the rotor 120 is moving relative to the side sheet 113. The tapered portion allows lateral motion in the non-operational position when the rotor 120 is stationary relative to the side sheet 113 (i.e., rotor 120 is not rotating). The tapered portion allows the tine device 130 to transition between the first and second positions (i.e., operational and non-operational positions).

Without in any way limiting the scope, interpretation, or application of the claims appearing below, a technical effect of one or more of the example embodiments or implementations disclosed herein is a tine device for an impeller conditioner which has restricted or inhibited lateral or side to side motion in the operational position. This allows the tine device to be positioned at or near an end of the impeller close to the side wall or sheet without contacting the side sheet. The tine device can still freely transition from an operational to a non-operational position. In the non-operational position, the tine device can move laterally or side to side when the rotor is stationary relative to the side wall of the impeller housing.

The terminology used herein is for describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. An impeller conditioner comprising:
   a rotor;
   an attachment device located on the rotor;
   a tine device pivotally attached to the rotor between a first end and a second end of the tine device via the attachment device;
   a positioning device located on one of the rotor and the attachment device, the positioning device including a tapered portion which restricts the tine device in a first position to have less lateral movement than the tine device in a second position;
   wherein the first position is an operational position with the first end of the tine device being positioned outwardly away from the rotor and the second end of the tine device being positioned near the rotor; and
   wherein the second position is a non-operational position with the second end of the tine device being positioned further from the rotor than the operational position.

2. The impeller conditioner of claim 1, wherein the positioning device is wider at a base than a top.

3. The impeller conditioner of claim 1, wherein the attachment device includes the positioning device such that the attachment device has a wider base than a top.

4. The impeller conditioner of claim 3, wherein the positioning device is integral with the attachment device.

5. The impeller conditioner of claim 1, wherein the tapered portion prevents the tine device from lateral movement when the tine device is in the first position.

6. The impeller conditioner of claim 5, wherein the tapered portion allows the tine device to move laterally when the tine is in the second position.

7. An agricultural mowing machine comprising:
   a cutter bar;
   an impeller comprising a rotor, an attachment device located on the rotor, a tine device pivotally attached to the rotor between a first end and a second end of the tine device via the attachment device, and a positioning device located on one of the rotor and the attachment device, the positioning device including a tapered portion which restricts the tine device in a first position to have less lateral movement than the tine device in a second position;
   wherein the first position is an operational position with the first end of the tine device being positioned outwardly away from the rotor and the second end of the tine device being positioned near the rotor; and
   wherein the second position is a non-operational position with the second end of the tine device being positioned further from the rotor than the operational position.

8. The agricultural mowing machine of claim 7, wherein the positioning device is wider at a base than a top.

9. The agricultural mowing machine of claim 7, wherein the attachment device includes the positioning device such that the attachment device has a wider base than a top.

10. The agricultural mowing machine of claim 9, wherein the positioning device is integral with the attachment device.

11. The agricultural mowing machine of claim 7, wherein the tapered portion prevents the tine device from lateral movement when the tine device is in the first position.

12. The agricultural mowing machine of claim 11, wherein the tapered portion allows the tine device to move laterally when the tine is in the second position.

* * * * *